3,461,083
CRYSTALLINE TiCl₃ AND METHOD OF PREPARING SAME

Luciano Luciani and Gianfranco Corsi, Ferrara, Italy, assignors to Montecatini Edison S.p.A., Milan, Italy
No Drawing. Filed Nov. 21, 1966, Ser. No. 595,638
Claims priority, application Italy, Nov. 25, 1965, 26,105/65
Int. Cl. B01j 11/12
U.S. Cl. 252—429    6 Claims

ABSTRACT OF THE DISCLOSURE

The present invention relates ot a process for the preparation of a crystalline composition of $TiCl_3$ for use in catalytic systems to effect low pressure polymerization of alpha-olefins. More particularly, this invention deals with an improvement in the process of making $TiCl_3$ involving activation by grinding of crystalline $TiCl_3$ compositions, obtained by reduction of $TiCl_4$ with metallic aluminum, in the presence of a metallorganic compound wherein the metal is from Group II or III of the Periodic Table.

Detailed description

Processes for the stereospecific polymerization of alpha-olefins, leading to the production of polymers having a high crystallinity and good general characteristics are known in the art. These processes are carried out under relatively moderate pressures, in the presence of particular catalysts consisting of a transition metal compound, preferably in a valence state lower than the maximum, and metallorganic compounds of elements from Group I, II or III of the Periodic Table, preferably aluminum compounds. As is known, particularly good results are obtained by using catalytic systems of $TiCl_3$ and a metallorganic aluminum compound.

Various methods have been described for the preparation of violet $TiCl_3$, which is present in the composition of these ctatlytic systems. One of these methods entails the reduction of $TiCl_4$ with a metallic aluminum to obtain a crystalline composition containing $TiCl_3$ and $AlCl_3$ in the molar ratio of 3:1 and characterized by a particular X-ray diffraction spectrum.

Depending on the temperature at which the product has been prepared, the crystalline composition will show the structure of either $\alpha$-$TiCl_3$ or $\gamma TiCl_3$.

The identification of the characteristics of these crystalline forms has been made, e.g., by Natta et al. [Journal of Polymer Science, vol. 51, pp. 399–410 (1961)].

In order to obtain superior results the crystalline composition should undergo an activation by grinding until the X-ray diffraction spectrum shows the structural characteristics of the $\delta$ form, as is described by Natta et al. [Journal of Polymer Science, vol. 51, pp. 387–398 and 399–410 (1961)], with a minimum elongation, $\Delta 2\theta$ of the line at $d=2.71A.(2\theta=33°)$, of 4 degrees.

As known [Natta et al., Journal of Polymer Science, vol. 51, pp. 399–410 (1961)], this line is affected by disorder between successive layers of the $TiCl_3$ structure, the changes of such line being an indication of such disorder.

This operation of activation by grinding is usally carried out in ball mills having a revolving or centrifugal drum. In industrial production, the size of this mill can be very large indeed, so that the amount of mechanical energy generated by friction between the grinding bodies, which results in heat, is extremely high.

In certain cases, in order to prevent the temperature from exceeding valuesw hich would result in a decrease in the catalytic activity of the product, it is necessary to provide for cooling of the mill with suitable means (e.g., cold water coils or the like).

It has in fact been observed that the product obtained by activation, by grinding, of $\gamma$-$TiCl_3$ at temperatures higher than about 100° C., shows an activity (measured, e.g., as grams of polymer produced per gram of $TiCl_3$) remarkedly decreased as compared to the activity of products activated by grinding at a temperature maintained at from about 20–40° C. In an analogous manner, activation by grinding of catalytically active commercial $TiCl_3$ at temperatures higher than 40° C. results in a lowering of its catalytic activity. By operating above 100° C., the reduction of the activity may even reach values of 50–70%.

We have now surprisingly found that the usual decreases of catalytic activity of $TiCl_3$ obtained by grinding at temperatures higher than 100° C. can be avoided in a simple manner, that is, by carrying out the grinding in the presence of a small amount of a metallorganic compound of a metal from Group II or III of the Periodic Table, preferably wherein the metal portion of such compound is aluminum, beryllium, or zinc.

This process is applicable to all types of $TiCl_3$ in the alpha or gamma forms, obtained by reduction of $TiCl_4$ with metallic aluminum, e.g., those obtained with the use of a solvent, with the use of an excess of liquid $TiCl_4$, or with stoichiometric ratios between $TiCl_4$ and free metallic aluminum, and regardless of whether the reduction has been carried out with conventional apparatus or has been carried out directly in the mill used for subsequent activation.

The execution of activation by grinding at a temperature higher than 100° C. results in the important advantage that there is no longer any necessity to cool the mill which, due to its very large thermal mass, would require a considerable expenditure of time, power and cooling fluid. This is of particular importance, when the $TiCl_4$ reduction reaction is carried out in the same mill, equipped to operate at the temperature required for the reduction, which is generally from about 100 to 200° C.

Another important advantage is that, by following the method of our invention, there results an increase in the index of isotacticity of the polyolefin (particularly polypropylene, polybutene and polystyrene) obtained by using the $TiCl_3$ thus prepared in the appropriate catalytic systems. The polypropylene index of isotacticity, as known, is defined as the percentage of polymer residue after extraction with boiling n-heptane. Thus, in comparison with polypropylene polymers obtained using a catalyst system based on $TiCl_3$ activated in known manner (at temperatures lower than 100° C., preferably between 20° and 40° C.), the index of isotacticity of polypropylene polymers obtained using a catalyst system based on $TiCl_3$ prepared by activation at temperatures higher than 100° C., in the presence of a metallorganic compound wherein the metal is from Group II or III in accordance with the present invention, is from about two to four percent higher.

The present invention therefore provides a process for preparing a crystalline composition of violet $TiCl_3$, obtained by the reduction of $TiCl_4$ with metallic aluminum and then activated by high grinding, characterized in that the grinding is carried out at a temperature of from about 100 to 125° C. and in the presence of from about two to six percent, by weight of the $TiCl_3$, of a metallorganic compound wherein the metal is from Group II or III of the Periodic Table. Most desirably the metallorganic compound should be a metal alkyl or a metal alkyl halide (wherein the alkyl group, linear or branched, may have up to 6 carbon atoms. The halogen atom in the halide may be I, Cl or Br).

When the grinding is carried out in a ball mill, it is preferable to operate under the conditions described in copending Italian patent application provisional filing number 5,675, according to which the selection of the operating parameters is carried out so that the factor $$(K_s+K_t)\frac{K_s}{K_t} \times \frac{D}{d} n^2$$

has a value of from about $2.5 \times 10^6$ to $8.5 \times 10^6$ wherein:

$K_s$ represents the degree of filing of the balls in kg./l.,
$K_t$ represents the degree of filing of $TiCl_3$ in kg./l.,
D represents the diameter of the mill in cm.,
d represents the diameter of the balls in cm., and
n represents the speed of revolution of the mill in revolutions/minute.

The grinding time at the temperature of from about 100 to 125° C. may vary, depending on the effectiveness of the grinding bodies, from a minimum of from about four hours to a maximum of about 24 hours.

The metal alkyls or metal alkyl halides that are suitable most preferably include compounds of aluminum, beryllium or of zinc, such as, $Al(C_2H_5)_3$, $Al(C_2H_5)_2Cl$, $Al(C_2H_5)_2Br$, $Al(C_2H_5)_2I$, $Al(C_2H_5)Cl_2$, $Al(C_4H_9)_3$, $Al(C_6H_{13})_3$, $Zn(C_2H_5)_2$, $Al(iso\text{-}Bu)_3$, $Zn(C_2H_5)Cl$, $Be(C_2H_5)_2$.

The invention will now be illustrated by various examples. These obviously are not intended to limit the invention to the particular operating conditions or to the apparatuses or materials described, which can be replaced by other equivalents within the scope of the present invention.

In order to evaluate the activity of the crystalline compositions thus obtained, in the following examples there was used a propylene polymerization run carried out under standard conditions as illustrated hereinbelow.

Into a 5-liter autoclave provided with a comb agitator, there were added 2 liters of n-heptane as the solvent, 1.6 g. of $TiCl_3$, 3.1 g. of $Al(C_2H_5)_2Cl$, and then a mixture of propylene and hydrogen (0.5 to 0.7% of hydrogen in the mixture) under a pressure of 7 atmospheres. The polymerization was carried out at a temperature of 70° C. and under a constant pressure of 7 atm. (maintained by appropriate additional feeding of the propylene-hydrogen mixture) for 3.5 hours.

At the end of the polymerization the polymeric suspension was discharged and subjected to steam distillation until all of the solvent had been removed, and the polymer was then vacuum dried at 80° C. for 16 hours.

In the following examples, the yield refers to grams of polypropylene obtained per gram of crystalline $TiCl_3$, per hour.

Example 1

In a series of comparative tests there was used a sample of $\gamma\text{-}TiCl_3$, obtained by reduction of $TiCl_4$ with metallic Al, in stoichiometric ratio, carried out in cyclohexane at a temperature of 150° C., for a time of 15 hours.

The product was freed from the solvent by drying at 150° C. under high vacuum for 7 hours. For the activation of the product there was used a 9-liter cylindrical steel mill, having a diameter of 9 cm., charged with stainless steel balls having a diameter of 20 mm. (coefficient of filling $K_s$=2.2 kg./l.) and 570 g. of the described $\gamma\text{-}TiCl_3$.

The mill was immersed in an oil bath for the heating, and revolved at a speed of 72 r.p.m.

The following tests were carried out:

(1) Activation of the product as is at 25° C. for 24 hours. The product obtained, used in the standard propylene polymerization run, gave the following results:

Polypropylene yield=165 g./g. $\delta\text{-}TiCl_3$/hour
Intrinsic viscosity=2.3
Index of isotacticity (I.I.)=89.5%

(2) Activation of the product as is at 120° C. for 24 hours. The product obtained in the standard polymerization run gave the following results:

Polypropylene yield=41 g./g. $\delta\text{-}TiCl_3$/hour
Intrinsic viscosity=2.1
Index of isotacticity (I.I.)=89.5%

(3) Activation carried out at 25° C. [as in (1)] but with the initial addition of 4.2 g. of $Al(C_2H_5)_2Cl$ per 100 g. of $\gamma\text{-}TiCl_3$. The standard polymerization run gave the following results:

Polypropylene yield=168 g./g. $\delta\text{-}TiCl_3$/hour
Intrinsic viscosity=2.1
Index of isotacticity=88%

(4) Activation was carried out at a temperature of 120° C. for 24 hours with the addition of 4.2 g. of $Al(C_2H_5)_2Cl$ per 100 g. of $\gamma\text{-}TiCl_3$. The standard polymerization run gave the following results:

Polypropylene yield=166 g./g. $\delta\text{-}TiCl_3$/hour
Intrinsic viscosity=1.6
Index of isotacticity (I.I.)=93.5%

(5) Activation at a temperature of 120° C. for 24 hours with the initial addition of 4.2 g. of $Al(C_2H_5)_3$ per 100 g. of $\gamma\text{-}TiCl_3$. The results of the standard polymerization run were as follows:

Polypropylene yield=130 g./g. $\delta\text{-}TiCl_3$/hour
Intrinsic viscosity=1.8
Index of isotacticity (I.I)=93.0%

(6) Activation at a temperature of 120° C. for 24 hours with an initial addition of 4.2 g. of $Zn(C_2H_5)_2$ per 100 g. of $\gamma\text{-}TiCl_3$. In the standard polymerization run the following results were obtained:

Polypropylene yield=130 g./g. $\delta\text{-}TiCl_3$/hour
Intrinsic viscosity=2.0
Index of isotacticity (I.I.)=93.5%

Example 2

A sample of $\gamma\text{-}TiCl_3$ was prepared by reduction of $TiCl_4$ (present in excess) with metallic aluminum in the absence of solvent. The reduction was carried out at 135° C. for 17 hours. Most of the $TiCl_4$ excess was removed by distillation and the product was then carefully dried at 135° C., under high vacuum.

On this product the following comparative activation tests were carried out by using the same apparatus and the same filling conditions as in Example 1 (speed of the mill=72 r.p.m.).

(1) Activation at a temperature of 25° C. for 24 hours. Results of the standard polymerization test:

Polypropylene yield=116 g./g. $\delta\text{-}TiCl_3$/hour
Intrinsic viscosity=2.5
Index of isotacticity (I.I.)=91.5%

(2) Activation at a temperature of 100° C. for 24 hours with an initial addition of 4.2 g. of $Al(C_2H_5)_2Cl$ per 100 g. of $\gamma\text{-}TiCl_3$.

Polypropylene yield=95 g./g. $\delta\text{-}TiCl_3$/hour
Intrinsic viscosity=2.2
Index of isotacticity (I.I.)=93.5%

Example 3

In the 9-liter mill of Example 1, there were introduced 570 g. of $TiCl_4$, 29 g. of metallic aluminum, and 15 g. of $AlCl_3$.

The mill contained 2.2 kg./liter of stainless steel balls and was immersed in a heating bath, kept at 150° C., in which it was rotated at the speed of 72 r.p.m.

Under these conditions the reduction of $TiCl_4$ occurs. The procedure was carried out for 5 hours. The temperature of the mill was then lowered to 25° C. and grinding was carried out at the same speed for a further 19 hours, in order to effect an activation of the product. The $\delta\text{-}TiCl_3$ thus obtained was used in the standard polymerization run, giving the following results:

Polypropylene yield=108 g./g. δ-TiCl₃/hour
Intrinsic viscosity=1.7
Index of isotacticity (I.I.)=90.0%

In the same apparatus, a comparative test was analogously carried out under the same operating conditions as regards the reduction stage.

The temperature was then reduced to 100° C. and 4.5 g. of Al(C₂H₅)₂Cl per 100 g. of γ-TiCl₃ were introduced into the mill, and grinding was continued for a further 19 hours. The δ-TiCl₃ obtained gave the following results in the standard polymerization run:

Polypropylene yield=130 g./g. δ-TiCl₃/hour
Intrinsic viscosity=2.3
Index of isotacticity (I.I.)=93.5%

Example 4

In a 200-liter semi-industrial mill, equipped for heating and cooling and having a diameter of 60 cm., stainless steel balls having a diameter of 2.5 cm. were charged with a filling coefficient $K_s$=2 kg./l., along with 12.9 kg. of TiCl₄, 640 g. of metallic aluminum, and 250 g. of AlCl₃. The reduction reaction was carried out at 220° C. for 5 hours while rotating the mill at a speed of 32 r.p.m.

The mill was then cooled to 25° C. and grinding was carried out at this temperature for a further 18 hours with a revolution speed of 38 r.p.m.

The δ-TiCl₃ obtained, used in the standard polymerization run, gave the following results:

Polypropylene yield=154 g./g. δ-TiCl₃/hour
Intrinsic viscosity=1.6
Index of isotacticity (I.I.)=89.7%

In an analogous test, at the end of the 5 hours of reduction at 220° C. the mill was cooled to 100° C., and there were added 4.0 g. of Al(C₂H₅)₂Cl per 100 g. of α-TiCl₃ present. The grinding was carried out at 100° C. for a further 19 hours at a revolution speed of 38 r.p.m. δ-TiCl₃ was obtained which, in the standard polymerization run, gave the following results:

Polypropylene yield=142 g./g. δ-TiCl₃/hour
Intrinsic viscosity=1.8
Index of isotacticity (I.I.)=93.0%

Example 5

With respect to the improvement on the index of isotacticity obtained under the conditions described and claimed in the present invention, we have found that this improvement also occurs when operating on products which previously have been subjected to conventional activation. This is shown below.

In the 9-liter mill of Example 1 and under the operating conditions therein described, 570 g. of δ-TiCl₃ (ARA-Stauffer product) were ground.

The product before grinding gave the following results in the standard polymerization run:

Polypropylene yield=120 g./g. δ-TiCl₃/hour
Intrinsic viscosity=2.1
Index of isotacticity (I.I.)=91.5%

When the product was subjected to grinding at 120° C. for 24 hours with a revolution speed of the mill of 72 r.p.m., the following results in the standard polymerization run were obtained:

Polypropylene yield=36 g./g. δ-TiCl₃/hour
Intrinsic viscosity=2.0
Index of isotacticity (I.I.)=91.5%

The inactivation from such grinding is shown by the marked decrease in yield.

In contrast, when the grinding at 120° C. for 24 hours was carried out with an initial addition of 4.5 g. of Al(C₂H₅)₂Cl per 100 g. of δ-TiCl₃, the product obtained gave the following results in the standard polymerization run:

Polypropylene yield=116 g./g. δ-TiCl₃/hour
Intrinsic viscosity=2.0
Index of isotacticity (I.I.)=93%

Note the improvement in index of isotacticity.

Variations, changes and modifications can, of course, be made without departing from the spirit and scope of the present invention.

Having thus described our invention, what we desire to secure and claim by Letters Patent is:

1. In a process for preparing a crystalline composition of violet TiCl₃, obtained by the reduction of TiCl₄ with metallic aluminum and then activated by grinding, the improvement comprising carrying out the grinding at a temperature of from about 100 to 125° C. in the presence of from about two to six percent by weight of the TiCl₃ of a metal alkyl halide or a metal alkyl wherein the metal of the metallorganic compound is selected from the group consisting of the metals of Groups II and III of the Periodic Table, the alkyl group contains up to 6 C atoms and the halogen is selected from the group consisting of Cl, Br and I.

2. The process of claim 1 wherein the metallorganic compound is aluminum diethylmonochloride.

3. The process of claim 1 wherein the metallorganic compound is triethylaluminum.

4. The process of claim 1 wherein the metallorganic compound is diethyl zinc.

5. The process of claim 1 wherein the grinding is carried out in a ball mill whose operating conditions are selected so that the factor $$(K_s + K_t) \frac{K_s}{K_t} \times \frac{D}{d} n^2$$

is from about 2.5×10⁶ to 8.5×10⁶, wherein
  $K_s$ represents the degree of filling of the balls in kg./l.
  $K_t$ represents the degree of filling of TiCl₃ in kg./l.,
  D represents the diameter of the mill in cm.,
  d represents the diameter of the balls in cm., and
  n represents the revolution speed of the mill in r.p.m.

6. Violet TiCl₃ obtained according to the process of claim 1.

References Cited

UNITED STATES PATENTS

| 3,032,513 | 5/1962 | Tornqvist et al. |
| 3,128,252 | 4/1964 | Tornqvist et al. |
| 3,141,872 | 7/1964 | Natta et al. |
| 3,172,865 | 3/1965 | Fennell. |
| 3,245,973 | 4/1966 | Natta et al. |
| 3,255,169 | 6/1966 | Kearby. |

PATRICK P. GARVIN, Primary Examiner

U.S. Cl. X.R.

23—87; 260—93, 94